US012417657B1

(12) United States Patent
Lin et al.

(10) Patent No.: US 12,417,657 B1
(45) Date of Patent: Sep. 16, 2025

(54) SYSTEMS AND METHODS FOR PREDICTING POST-EVENT VEHICLE OCCUPANT INJURY

(71) Applicant: GM GLOBAL TECHNOLOGY OPERATIONS LLC, Detroit, MI (US)

(72) Inventors: Chin-hsu Lin, Troy, MI (US); Susan H. Owen, Bloomfield, MI (US); Sean Taylor Coughlin, Shelby Township, MI (US); Alok Warey, Novi, MI (US); Mitesh Lalwala, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 27 days.

(21) Appl. No.: 18/641,542

(22) Filed: Apr. 22, 2024

(51) Int. Cl.
*G07C 5/08* (2006.01)

(52) U.S. Cl.
CPC .................................. *G07C 5/0808* (2013.01)

(58) Field of Classification Search
CPC .... G07C 5/008; G07C 5/0808; G07C 5/0841; B60R 2021/0104; B60R 21/01516; B60R 21/01544; B60R 21/01554; A61B 5/6893
See application file for complete search history.

(56) References Cited

U.S. PATENT DOCUMENTS

| | | | | |
|---|---|---|---|---|
| 7,013,704 | B2 * | 3/2006 | Kusters | G01M 17/0072 73/1.79 |
| 11,610,684 | B2 * | 3/2023 | Ben Gad | B60R 21/01508 |
| 2008/0228358 | A1 * | 9/2008 | Wang | B60R 21/01554 701/49 |
| 2014/0350797 | A1 * | 11/2014 | D'Addetta | B60R 21/0132 701/45 |
| 2020/0273582 | A1 * | 8/2020 | Ben Gad | G16H 50/20 |
| 2023/0256903 | A1 * | 8/2023 | Gilbert-Eyres | B60R 21/01538 340/438 |

FOREIGN PATENT DOCUMENTS

| | | | |
|---|---|---|---|
| DE | 102018118129 | A1 | 1/2020 |
| DE | 102021132424 | A1 | 6/2022 |
| DE | 102022120111 | A1 | 3/2023 |
| DE | 102022104129 | A1 | 8/2023 |
| DE | 102022126318 | A1 | 8/2023 |

* cited by examiner

*Primary Examiner* — Muhammad Adnan
(74) *Attorney, Agent, or Firm* — Ingrassia Fisher & Lorenz, LLP | IF&L

(57) ABSTRACT

A vehicle event database includes simulation-based vehicle event metadata associated with a vehicle architecture. The metadata is generated by determining vehicle event pulses, applying the vehicle event pulses to a vehicle simulation model, collecting injury data associated with body regions of a simulated occupant within the vehicle simulation model, and predicting a probability of injury to the body regions of an actual occupant of a vehicle having the vehicle architecture based on the injury data. A vehicle event notification is received from a vehicle. Vehicle data and occupant data are received. The simulation-based vehicle event metadata associated with the vehicle architecture of the vehicle is retrieved from the vehicle event database. An injury to a first body region of the body regions of the actual occupant is predicted based on the vehicle data, the occupant data, and the simulation-based vehicle event metadata using an injury prediction model.

20 Claims, 7 Drawing Sheets

SYSTEMS AND METHODS FOR PREDICTING POST-EVENT VEHICLE OCCUPANT INJURY

INTRODUCTION

The technical field generally relates to vehicles, and more particularly relates to systems and methods for predicting post-event vehicle occupant injury.

Actual vehicle event data is typically used by statistical analysis models and machine learning models to predict injuries to occupants of vehicles in vehicle event situations. A vehicle event may include contact between a vehicle and another vehicle or contact between the vehicle and an object that may result in injuries to one or more occupants of the vehicle. The availability of actual vehicle event data may be limited for various vehicle event scenarios. Examples of such vehicle scenarios include, but are not limited to, second and third row vehicle occupants, out of position occupants, vulnerable vehicle occupants, and new vehicle structures (e.g. electric vehicles and autonomous vehicles). The actual vehicle event data deficiencies may create challenges for statistical analysis models and machine learning models to accurately predict vehicle occupant injuries in vehicle event situations. First responders and hospital personnel often rely on vehicle occupant injury predictions to effectively triage, prioritize, and transport vehicle occupants that have been injured in a vehicle event. Inaccuracies in the prediction of vehicle occupant injuries may impede the first responders' and/or the hospital personnel's ability to properly support the needs of vehicle occupants and handle vehicle occupant injuries in a timely manner.

Accordingly, it is desirable to provide improved methods and systems for predicting post-event vehicle occupant injuries using simulation-based vehicle event metadata. Other desirable features and characteristics will become apparent from the subsequent detailed description and the appended claims, taken in conjunction with the accompanying drawings and the foregoing technical field and background.

SUMMARY

A post-event vehicle occupant injury prediction system includes a vehicle event database, at least one processor and at least one memory. The at least one processor is communicatively coupled to the vehicle event database. The at least one memory is communicatively coupled to the at least one processor. The vehicle event database includes simulation-based vehicle event metadata associated with a vehicle architecture. The simulation-based vehicle event metadata generation is based at least in part on: determining vehicle event pulses for the vehicle architecture; applying the vehicle event pulses to a vehicle simulation model of the vehicle architecture; collecting injury data associated with body regions of a simulated occupant within the vehicle simulation model resulting from the application of the vehicle event pulses to the vehicle simulation model; and predicting a probability of injury to each of the body regions of an actual occupant of a vehicle having the vehicle architecture based on the injury data. The at least one memory includes instructions that upon execution by the at least one processor, causes the at least one processor to: receive a vehicle event notification from a vehicle having the vehicle architecture; receive vehicle data associated with the vehicle and occupant data associated with an actual occupant of the vehicle; retrieve the simulation-based vehicle event metadata associated with the vehicle architecture from the vehicle event database; and predict an injury to a first body region of the body regions of the actual occupant based on the vehicle data, the occupant data, and the simulation-based vehicle event metadata using an injury prediction model.

In at least one embodiment, the at least one memory includes further instructions that upon execution by the at least one processor, causes the at least one processor to transmit the predicted injury to the first body region of the actual occupant to at least one of a first responder device and a hospital device.

In at least one embodiment, the vehicle event pulses are one of acceleration vehicle event pulses and velocity vehicle event pulses.

In at least one embodiment, the vehicle event pulses are applied to the vehicle simulation model under a plurality of vehicle event conditions including a plurality of impact speeds, a plurality of impact directions, a plurality of vehicle seating orientations, a plurality of occupant seating locations, a plurality of occupant vulnerabilities, a plurality of occupant postures, and occupant biometric data.

In at least one embodiment, one of the plurality of occupant postures is a reclining posture.

In at least one embodiment, the body regions include a head region, a neck region, a thorax region, a femur region, a lower leg region, and an abdomen region.

In at least one embodiment, the simulation-based vehicle event metadata generation is based at least in part on predicting a probability of overall injury to the simulated occupant based on the injury data.

In at least one embodiment, the predicted probability of overall injury to the simulated occupant is adjusted in accordance with an occupant frailty parameter.

In at least one embodiment, the predicted probability of injury to each of the body regions of the simulated occupant is adjusted in accordance with an occupant frailty parameter.

In at least one embodiment, the vehicle event database includes actual vehicle event metadata associated with the vehicle architecture.

In at least one embodiment, the injury prediction model is one of a statistical analysis model and a machine learning model.

In at least one embodiment, the simulation-based vehicle event metadata includes a plurality of impact directions, the vehicle event pulses, occupant biometric data, a plurality of occupant seating locations, restraint data, the probability of injury to each of the body regions, and a probability of overall injury.

In at least one embodiment, the vehicle data includes a vehicle body type, a vehicle model year, a total delta velocity, a principle direction of force, delta velocities along a first and second axis, a resultant impact delta velocity and delta direction, rollover data, and vehicle seating orientation.

In at least one embodiment, the occupant data includes an actual occupant seating location, an actual occupant posture relative to a seat and a restraint system, actual occupant belting data, an actual occupant weight, an actual occupant height, an actual occupant frailty parameter, an actual occupant sex, an actual occupant motion, and an actual occupant position.

A method for predicting post-event vehicle occupant injury is provided. The method includes providing a vehicle event database including simulation-based vehicle event metadata associated with a vehicle architecture. The simulation-based vehicle event metadata generation is based at least in part on: determining vehicle event pulses for the vehicle architecture; applying the vehicle event pulses to a vehicle simulation model of the vehicle architecture; collecting injury data associated with body regions of a simulated occupant within the vehicle simulation model resulting from the application of the vehicle event pulses to the vehicle simulation model; and predicting a probability of injury to each of the body regions of an actual occupant of a vehicle having the vehicle architecture based on the injury data. The method also includes: receiving a vehicle event notification from a vehicle having the vehicle architecture; receiving vehicle data associated with the vehicle and occupant data associated with an actual occupant of the vehicle; retrieving the simulation-based vehicle event metadata associated with the vehicle architecture from the vehicle event database; and predicting an injury to a first body region of the body regions of the actual occupant based on the vehicle data, the occupant data, and the simulation-based vehicle event metadata using an injury prediction model.

In at least one embodiment, the method further includes transmitting the predicted injury to the first body region of the actual occupant to at least one of a first responder device and a hospital device.

In at least one embodiment, the vehicle event pulses are applied to the vehicle simulation model under a plurality of vehicle event conditions including a plurality of impact speeds, a plurality of impact directions, a plurality of vehicle seating orientations, a plurality of occupant seating locations, a plurality of occupant vulnerabilities, a plurality of occupant postures, and occupant biometric data.

In at least one embodiment, the body regions include a head region, a neck region, a thorax region, a femur region, a lower leg region, and an abdomen region.

In at least one embodiment, the predicted probability of injury to each of the body regions of the simulated occupant is adjusted in accordance with an occupant frailty parameter.

A non-transitory machine-readable storage medium that stores instructions executable by at least one processor, the instructions configurable to cause the at least one processor to perform operations including: providing a vehicle event database including simulation-based vehicle event metadata associated with a vehicle architecture, the simulation-based vehicle event metadata generation being based at least in part on: determining vehicle event pulses for the vehicle architecture; applying the vehicle event pulses to a vehicle simulation model of the vehicle architecture; collecting injury data associated with body regions of a simulated occupant within the vehicle simulation model resulting from the application of the vehicle event pulses to the vehicle simulation model; and predicting a probability of injury to each of the body regions of an actual occupant of a vehicle having the vehicle architecture based on the injury data; receiving a vehicle event notification from a vehicle having the vehicle architecture; receiving vehicle data associated with the vehicle and occupant data associated with the actual occupant of the vehicle; retrieving the simulation-based vehicle event metadata associated with the vehicle architecture from the vehicle event database; and predicting an injury to a first body region of the body regions of the actual occupant based on the vehicle data, the occupant data, and the simulation-based vehicle event metadata using an injury prediction model.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In various embodiments, the present disclosure may employ a cloud computing system. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
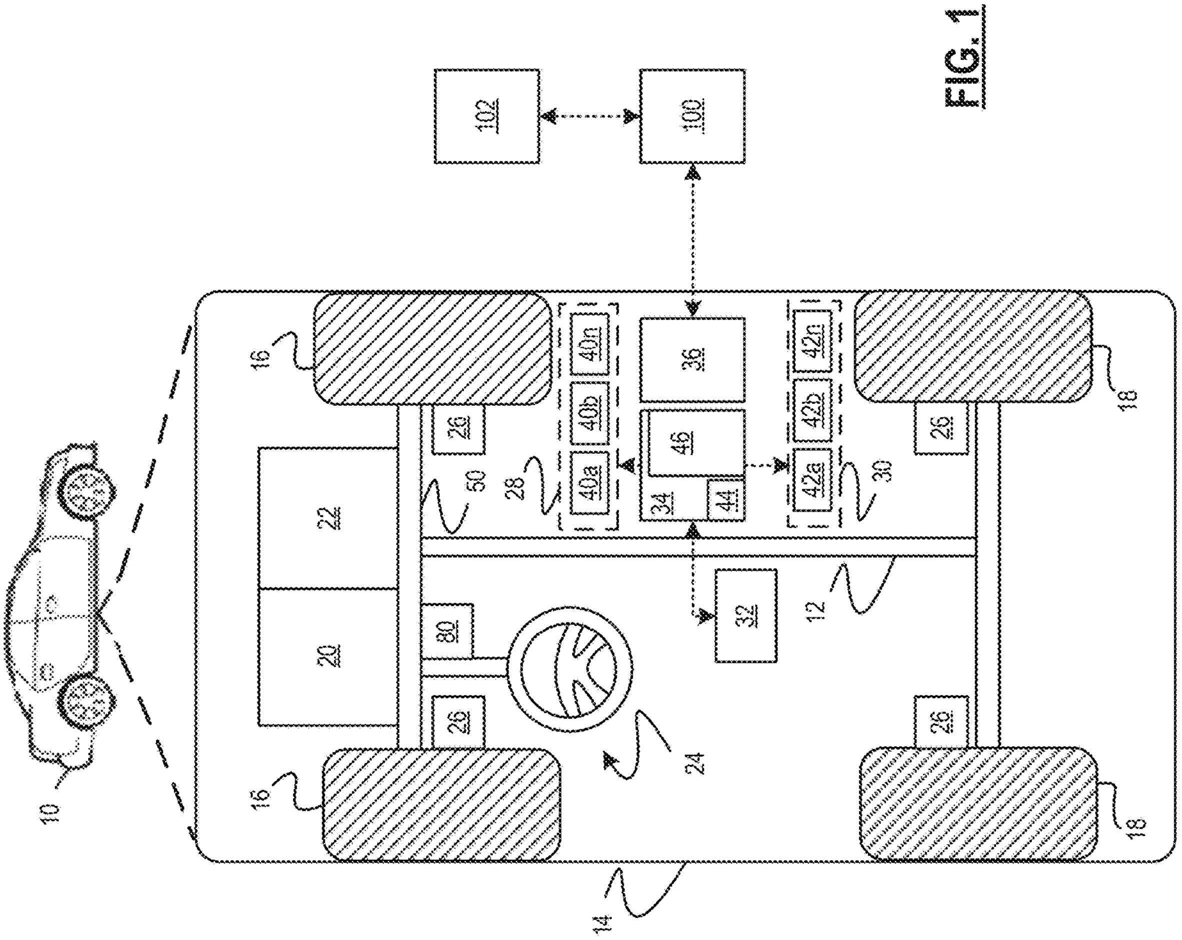
FIG. 1 is a functional block diagram of a vehicle communicatively coupled to a post-event vehicle occupant injury prediction system in accordance with at least one embodiment.

Referring to FIG. 1, a functional block diagram of a vehicle 10 communicatively coupled to a post-event vehicle occupant injury prediction system 100 in accordance with at least one embodiment is shown. The post-event vehicle occupant injury prediction system 100 is configured to be communicatively coupled to a first responder device 102. In various embodiments, the post-event vehicle occupant injury prediction system 100 is configured to be communicatively coupled to a hospital device. The vehicle 10 generally includes a chassis 12, a body 14, front wheels 16, and rear wheels 18. While the vehicle 10 is depicted in the illustrated embodiment as a passenger car, the vehicle 10 may be other types of vehicles including trucks, sport utility vehicles (SUVs), and recreational vehicles (RVs).

In various embodiments, the body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous or semi-autonomous vehicle that is automatically controlled to carry passengers and/or cargo from one place to another. For example, in an exemplary embodiment, the vehicle 10 is a so-called Level Two, Level Three, Level Four or Level Five automation system. Level two automation means the vehicle assists the driver in various driving tasks with driver supervision. Level three automation means the vehicle can take over all driving functions under certain circumstances. All major functions are automated, including braking, steering, and acceleration. At this level, the driver can fully disengage until the vehicle tells the driver otherwise. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20 a transmission system 22, a steering system 24, a braking system 26, a sensor system 28, an actuator system 30, at least one data storage device 32, at least one controller 34, and a communication system 36. The controller 34 is configured to implement an automated driving system (ADS). The propulsion system 20 is configured to generate power to propel the vehicle. The propulsion system 20 may, in various embodiments, include an internal combustion engine, an electric machine such as a traction motor, a fuel cell propulsion system, and/or any other type of propulsion configuration. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The braking system 26 is configured to provide braking torque to the vehicle wheels 16-18. The braking system 26 may, in various embodiments, include friction brakes, brake by wire, a regenerative braking system such as an electric machine, and/or other appropriate braking systems.

The steering system 24 is configured to influence a position of the of the vehicle wheels 16. While depicted as including a steering wheel and steering column, for illustrative purposes, in some embodiments contemplated within the scope of the present disclosure, the steering system 24 may not include a steering wheel and/or steering column. The steering system 24 includes a steering column coupled to an axle 50 associated with the front wheels 16 through, for example, a rack and pinion or other mechanism (not shown). Alternatively, the steering system 24 may include a steer by wire system that includes actuators associated with each of the front wheels 16.

The sensor system 28 includes one or more sensing devices 40*a*-40*n* that sense observable conditions of the exterior environment and/or the interior environment of the vehicle 10. The sensing devices 40*a*-40*n* can include, but are not limited to, radars, lidars, global positioning systems, optical cameras, thermal cameras, ultrasonic sensors, and/or other sensors.

The vehicle dynamics sensors provide vehicle dynamics data including longitudinal speed, yaw rate, lateral acceleration, longitudinal acceleration, etc. The vehicle dynamics sensors may include wheel sensors that measure information pertaining to one or more wheels of the vehicle 10. In one embodiment, the wheel sensors comprise wheel speed sensors that are coupled to each of the wheels 16-18 of the vehicle 10. Further, the vehicle dynamics sensors may include one or more accelerometers (provided as part of an Inertial Measurement Unit (IMU)) that measure information pertaining to an acceleration of the vehicle 10. In various embodiments, the accelerometers measure one or more acceleration values for the vehicle 10, including latitudinal and longitudinal acceleration and yaw rate.

The actuator system 30 includes one or more actuator devices 42*a*-42*n* that control one or more vehicle features such as, but not limited to, the propulsion system 20, the transmission system 22, the steering system 24, and the braking system 26. In various embodiments, the vehicle features can further include interior and/or exterior vehicle features such as, but are not limited to, doors, a trunk, and cabin features such as air, music, lighting, etc. (not numbered).

The communication system 36 is configured to wirelessly communicate information to and from other entities 48, such as but not limited to, other vehicles ("V2V" communication,) infrastructure ("V2I" communication), remote systems, and/or personal devices. In at least one embodiment, the communication system 36 is configured to wirelessly communicate with the post-event vehicle occupant injury prediction system 100. In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in the ADS of the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10. In various embodiments, the controller(s) 34 are configured to implement ADS.

Figure 2:
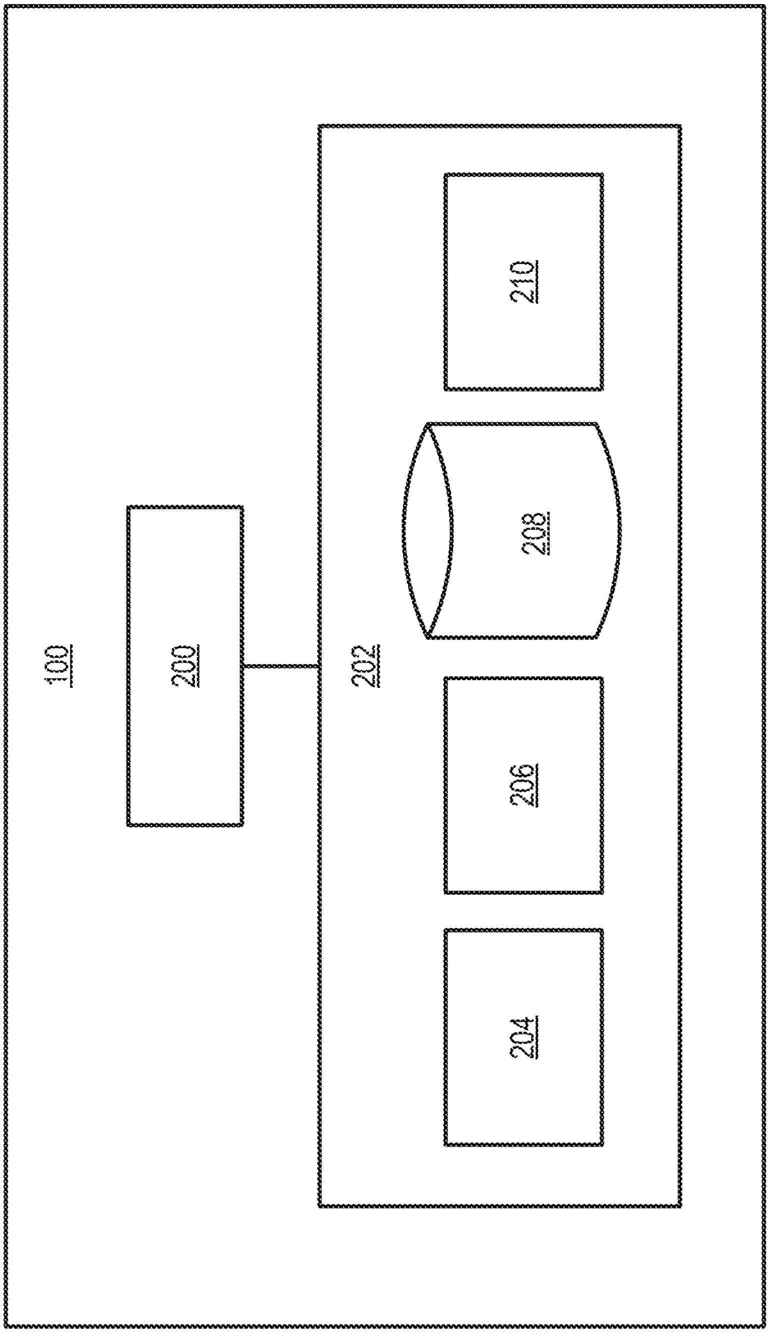
FIG. 2 is a functional block diagram of a post-event vehicle occupant injury prediction system in accordance with at least one embodiment.

Referring to FIG. 2, a functional block diagram of a post-event vehicle occupant injury prediction system 100 in accordance with at least one embodiment is shown. The post-event vehicle occupant injury prediction system 100 includes at least one processor 200 and at least one memory 202. The processor(s) 200 is communicatively coupled to the at least one memory 202. The processor(s) 200 is a programable device that includes one or more instructions stored in or associated with the at least one memory 202. The at least one memory 202 includes instructions that the processor(s) 200 is configured to execute. The at least one memory 202 includes a vehicle data module 204, an occupant data module 206, a vehicle event database 208, and an injury prediction model 210.

A vehicle event (also referred to as an event) includes contact between a vehicle and another vehicle or contact between the vehicle and an object that may potentially case injuries to one or more occupants of the vehicle. The vehicle data module 204 is configured to receive a vehicle event notification from a vehicle 10 that is involved in a vehicle event and vehicle data associated with the vehicle 10. The occupant data module 206 is configured to receive occupant data associated with the actual occupants of the vehicle 10. The vehicle event database 208 is configured to store simulation-based vehicle event metadata associated with a vehicle architecture of the vehicle 10. The injury prediction model 210 is configured to predict injuries to one or more body regions of the actual occupants of the vehicle based on the vehicle data, the occupant data, and the simulation-based vehicle event metadata. The post-event vehicle occupant injury prediction system 100 may include additional components that facilitate operation of the post-event vehicle occupant injury prediction system 100.

Figure 3:
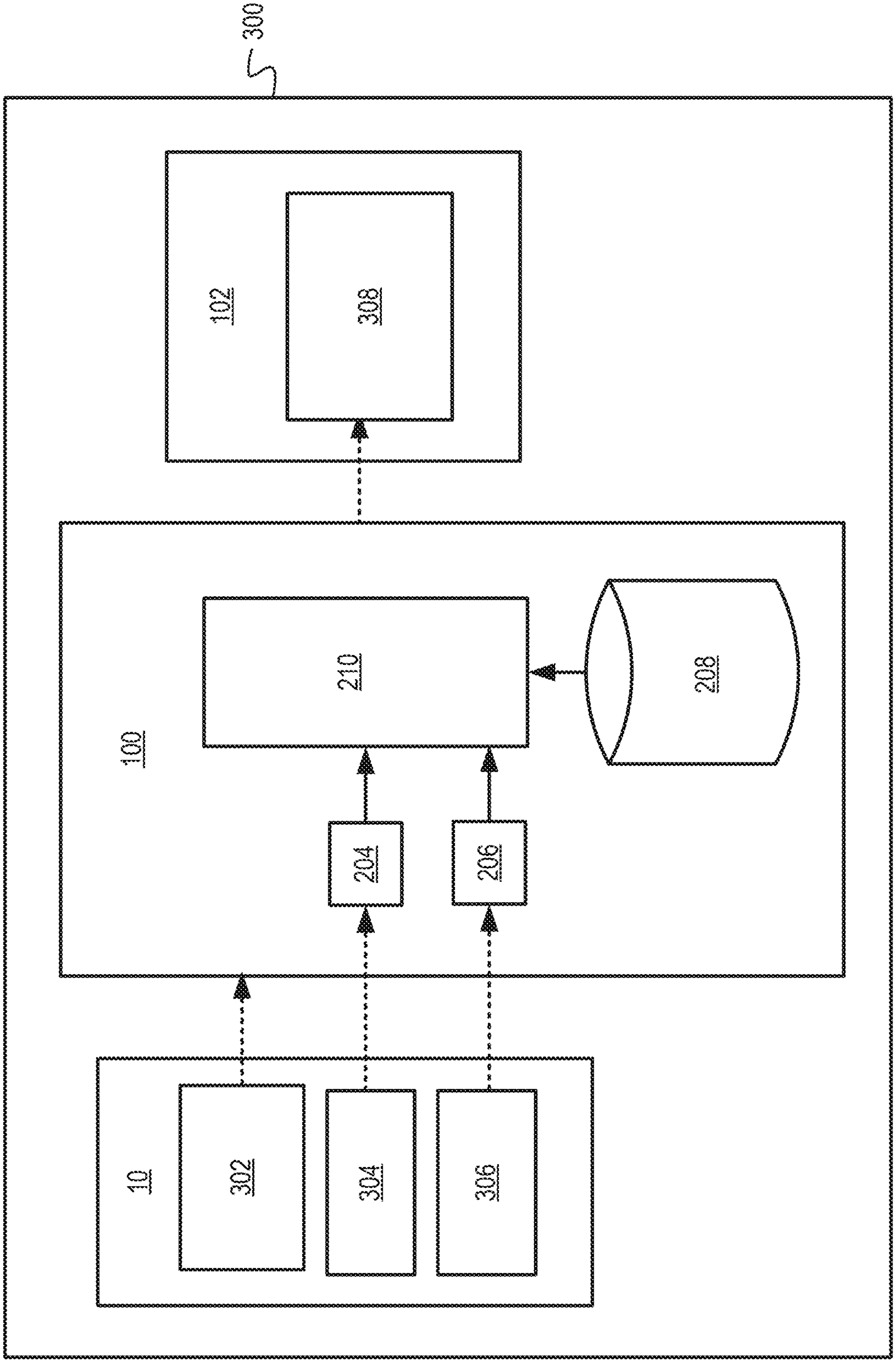
FIG. 3 is a system including a post-event vehicle occupant injury prediction system in accordance with at least one embodiment.

Referring to FIG. 3, a system 300 including a post-event vehicle occupant injury prediction system 100 in accordance with at least one embodiment is shown. The system 300 includes a vehicle 10 having a specific vehicle architecture, the post-event vehicle occupant injury prediction system 100, and a first responder device 102. In various embodiments, the system 300 includes a vehicle 10 having a specific vehicle architecture, the post-event vehicle occupant injury prediction system 100, and a hospital device. When the vehicle 10 is involved in an event, the vehicle 10 is configured to establish a communication channel with the post-event vehicle occupant injury prediction system 100 and transmit a vehicle event notification 302 to the post-event vehicle occupant injury prediction system 100. A vehicle event (also referred to as an event) includes contact between a vehicle and another vehicle or contact between the vehicle and an object that may potentially case injuries to one or more occupants of the vehicle.

The vehicle 10 is configured to transmit vehicle data 304 to the post-event vehicle occupant injury prediction system 100. Examples of vehicle data 304 include, but are not limited to, a vehicle body type, a vehicle model year, a total delta velocity, a principle direction of force, delta velocities along a first and second axis, a resultant impact delta velocity and delta direction, rollover data, and vehicle seating orientation. As described with reference to FIG. 1, the vehicle 10 includes a sensor system 28. In various embodiments, the vehicle 10 may transmit vehicle data 304 detected by the sensor system 38 to the post-event vehicle occupant injury prediction system 100.

The vehicle 10 is configured to transmit occupant data 306 to the post-event vehicle occupant injury prediction system 100. The vehicle 10 may have multiple actual occupants in the vehicle 10. The vehicle 10 is configured to transmit occupant data 306 associated with each of the actual occupants in the vehicle 10 to the post-event vehicle occupant injury prediction system 100. Examples of occupant data 306 include, but are not limited to, comprises an actual occupant seating location, an actual occupant posture relative to a seat and a restraint system, actual occupant belting data, an actual occupant weight, an actual occupant height, an actual occupant frailty parameter, an actual occupant sex, an actual occupant motion, and an actual occupant position. In various embodiments, the vehicle 10 may transmit occupant data 306 detected by the sensor system 38 to the post-event vehicle occupant injury prediction system 100. An example of an actual occupant posture is a reclining posture. The actual occupant frailty may be age related and/or gender related.

The post-event vehicle occupant injury prediction system 100 is configured to receive the vehicle event notification 302 from the vehicle 10. The post-event vehicle occupant injury prediction system 100 includes the vehicle data module 204, the occupant data module 206, the vehicle event database 208, and the injury prediction model 210. The vehicle data module 204 is configured to receive the vehicle data 304 from the vehicle 10. The occupant data module 206 is configured to receive the occupant data 306 from the vehicle 10.

The vehicle event database 208 is configured to store simulation-based vehicle event metadata. In at least one embodiment, the vehicle event database 208 is configured to store simulation-based vehicle event metadata associated with different vehicle architectures. Examples of simulation-based vehicle event metadata associated with a vehicle architecture include, but are not limited to, a plurality of impact directions, vehicle event pulses, occupant biometric data, a plurality of occupant seating locations within the vehicle architecture, restraint data, the probability of injury to body regions of actual occupants in the vehicle 10, and a probability of overall injury to actual occupants in the vehicle 10. In at least one embodiment, the vehicle event database includes actual vehicle event metadata associated with the vehicle architecture. The manner in which the simulation-based vehicle event metadata is generated will be described in greater detail below with reference to FIG. 4.

In at least one embodiment, the injury prediction model 210 is a statistical analysis model. In at least one embodiment, the injury prediction model 210 is a machine learning model. In at least one embodiment, the simulation-based vehicle event metadata is used to train the machine learning model. The injury prediction model 210 is configured to receive the vehicle data 304 received from the vehicle 10 via the vehicle data module 204 and the occupant data 306 received from the vehicle 10 via the occupant data module 206. In various embodiments, the injury prediction module 210 identifies the vehicle architecture of the vehicle 10 involved in the vehicle event from the received vehicle data 304. The injury prediction model 210 is configured to retrieve the simulation-based vehicle event metadata associated with the identified vehicle architecture of the vehicle 10 from the vehicle event database 208.

The injury prediction model 210 is configured to predict injuries to one or more body regions of individual actual occupants in the vehicle 10 based on the vehicle data, the occupant data, and the retrieved simulation-based vehicle event metadata associated with the vehicle architecture of the vehicle 10 involved in the vehicle event. Examples of body regions include, but are not limited to, a head region, a neck region, a thorax region, a femur region, a lower leg region, and an abdomen region. In various embodiments, injury prediction model 210 is configured to predict overall injury to individual actual occupants in the vehicle 10 based on the vehicle data, the occupant data, and the retrieved simulation-based vehicle event metadata associated with the vehicle architecture of the vehicle 10 involved in the vehicle event.

In at least one embodiment, the post-event vehicle occupant injury prediction system 100 is configured to transmit the injury prediction 308 generated by the injury prediction model 210 to the first responder device 102. In at least one embodiment, the post-event vehicle occupant injury prediction system 100 is configured to transmit the injury prediction 308 generated by the injury prediction model 210 to a hospital device.

In at least one embodiment, the injury prediction 308 includes the prediction of injuries to one or more body regions of the individual actual occupants in the vehicle 10. In at least one embodiment, the injury prediction 308 includes the prediction of overall injury to individual actual occupants in the vehicle 10. In at least one embodiment, the injury prediction 308 includes the prediction of injuries to one or more body regions of the individual actual occupants in the vehicle 10 and the prediction of overall injury to individual actual occupants in the vehicle 10. In at least one embodiment, receiving the predicted injury 308 enables first responders to efficiently identify and treat injuries to the actual occupants of the vehicle 10. In at least one embodiment, receiving the predicted injury 308 enables hospital personnel to efficiently identify and treat injuries to the actual occupants of the vehicle 10.

Figure 4:
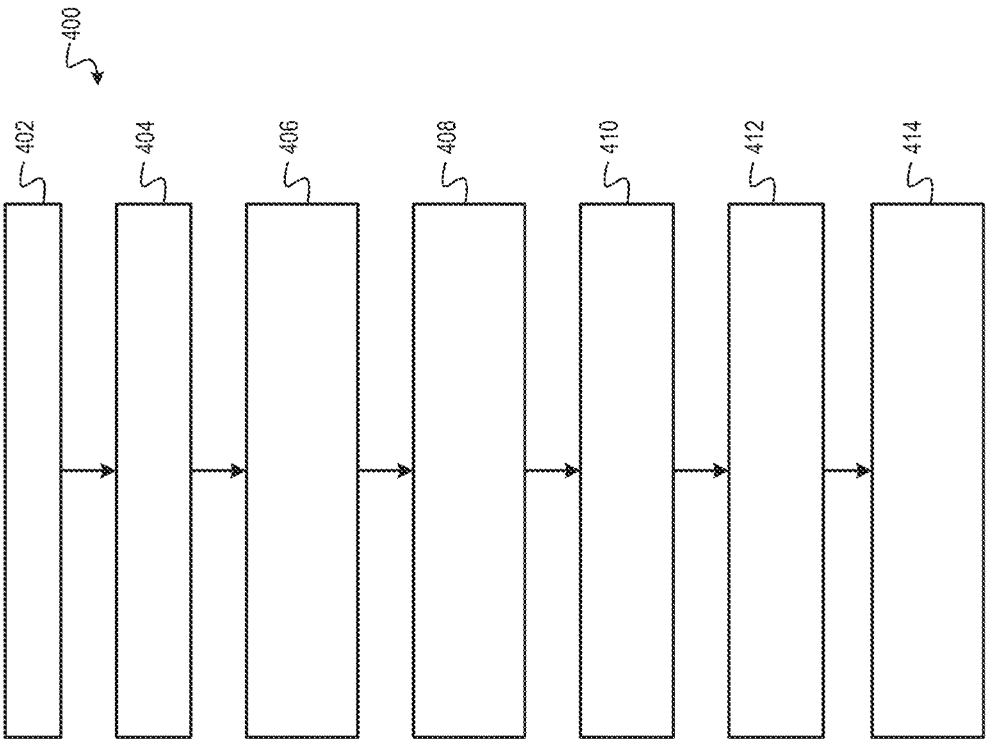
FIG. 4 is a flowchart representation of an exemplary method of generating simulation-based vehicle event metadata for storage in the vehicle event database in accordance with at least one embodiment.

Referring to FIG. 4, a flowchart representation of an exemplary method 400 of generating simulation-based vehicle event metadata for storage in the vehicle event database 208 in accordance with at least one embodiment is shown. Vehicle event simulations are performed using vehicle simulation models and simulated occupants for different vehicle architectures to generate the simulation-based vehicle event metadata for the different vehicle architectures for storage in the vehicle event database 208. As can be appreciated in light of the disclosure, the order of operation within the method 400 is not limited to the sequential execution as illustrated in FIG. 4 but may be performed in one or more varying orders as applicable and in accordance with the present disclosure.

At 402, vehicle event pulses are determined for a vehicle architecture. Different vehicle architectures have different vehicle event pulses. Examples of vehicle event pulses include acceleration vehicle event pulses and velocity vehicle event pulses. Examples of vehicle architecture include, but are not limited to, electric vehicle (EV) sedans, internal combustion engine (ICG) sedans, EV pick-up trucks, ICG pick-up trucks, EV sports utility vehicles (SUV) and ICG SUVs. Additional examples of vehicle architecture include traditional and non-traditional vehicle seating arrangements and orientations.

Figure 5A:
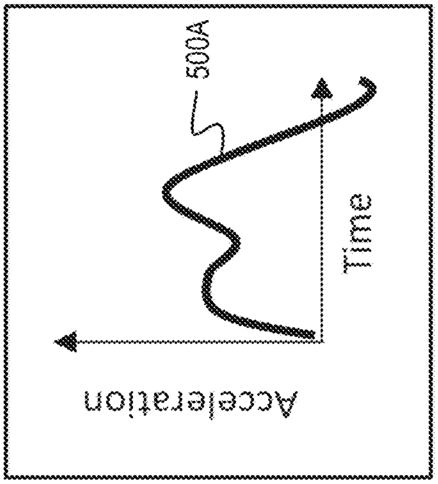
FIG. 5A-5B are graphical representations of exemplary vehicle event pulses in accordance with at least one embodiment.
Figure 5B:
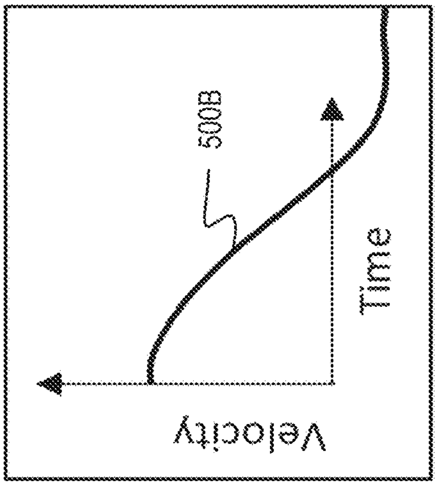

Referring to FIG. 5A and FIG. 5B, graphical representations of exemplary vehicle event pulses 500A, 500B in accordance with at least one embodiment are shown. FIG. 5A illustrates a graphical representation of an example of an acceleration vehicle event pulse 500A for a specific vehicle architecture. FIG. B illustrates a graphical representation of an example of a velocity vehicle event pulse 500B for the specific vehicle architecture.

Referring back to FIG. 4, at 404, the determined vehicle event pulses 500A, 500B for the specific vehicle architecture are applied to a vehicle simulation model of that vehicle architecture. Different vehicle architectures have different vehicle simulation models. In at least one embodiment, the vehicle event pulses 500A, 500B applied to the vehicle simulation model of the specific vehicle specific architecture are acceleration vehicle event pulses 500A. In at least one embodiment, the vehicle event pulses applied to the vehicle simulation model of the specific vehicle specific architecture are velocity vehicle event pulses 500B.

The vehicle event pulses 500A, 500B are applied to the vehicle simulation model under a plurality of different vehicle event conditions. Examples of the different vehicle event conditions include, but are not limited to, a plurality of different impact speeds, a plurality of different impact directions, a plurality of different vehicle seating arrangements and orientations, a plurality of different occupant seating locations, a plurality of different occupant vulnerabilities, a plurality of different occupant postures, and occupant biometric data. Examples of occupant vulnerabilities include, but are not limited to, vulnerabilities associated with infant occupants and vulnerabilities associated with elderly occupants. An example of an occupant postures is a reclining posture.

Figure 6:
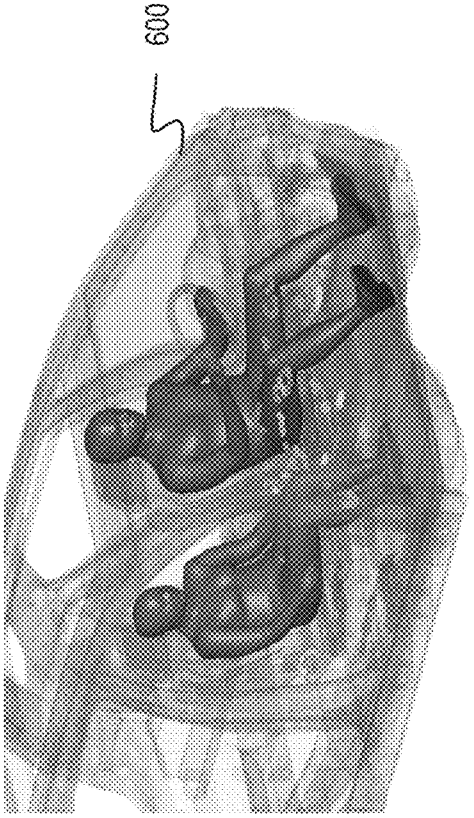
FIG. 6 is an illustration of an exemplary vehicle simulation model in accordance with at least one embodiment.

Referring to FIG. 6, an illustration of an exemplary vehicle simulation model 600 in accordance with at least one embodiment is shown. The vehicle simulation model 600 includes two simulated occupants. The vehicle event pulses 500A, 500B are applied to the vehicle simulation model under the plurality of different vehicle event conditions.

Referring back to FIG. 4, at 406, injury data associated with different body regions of the simulated occupants within the vehicle simulation vehicle 600 are collected under the plurality of different vehicle event conditions. Examples of the body regions include, but are not limited to, a head region, a neck region, a thorax region, a femur region, a lower leg region, and an abdomen region.

Figure 7A:
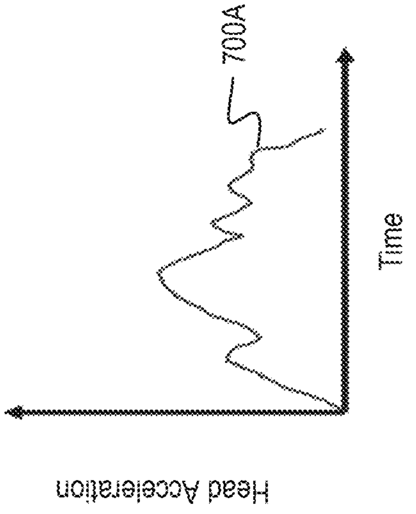
FIG. 7A-7B are graphical representations of exemplary injury data in accordance with at least one embodiment.
Figure 7B:
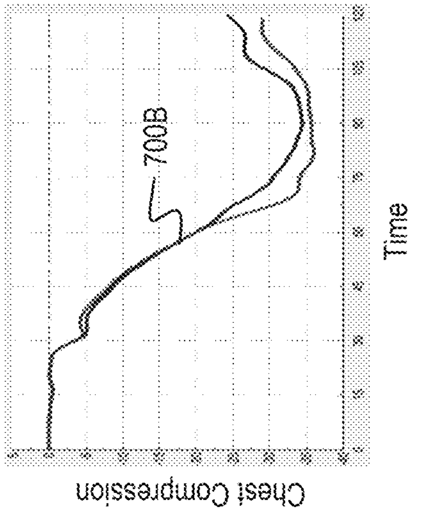

Referring to FIG. 7A and FIG. 7B, graphical representations of exemplary injury data 700A, 700B in accordance with at least one embodiment are shown. FIG. 7A illustrates a graphical representation of an example of head acceleration of a simulated occupant as a function of time 700A. Head acceleration as a function of time 700A is an example of the collected injury data associated with the head region. FIG. 7B illustrates a graphical representation of an example of chest compression as a function of time 700B. Chest compression as a function of time 700B is an example of collected injury data associated with the thorax region.

Referring back to FIG. 4, at 408, the probability of injury to each of the body regions of actual occupants of a vehicle 10 having the specific vehicle architecture is predicted based on the collected injury data using an injury prediction model 210. Examples of an injury prediction models include, but are not limited to, statistical analysis models and machine learning models. At 410, the probability of injury to each of the body regions is adjusted in accordance with an occupant frailty parameter. Occupant frailty parameters of a vehicle occupant may increase the probability of injury to different body regions of the occupant. Examples of occupant frailty parameters include, but are not limited to, elderly occupants, infant occupants, and occupants suffering from an illness. In various embodiments, the occupant frailty parameters may be based on an age of an occupant and/or a gender of an occupant. In at least one embodiment, the occupant frailty parameters may be artificial intelligence (AI) generated.

At 412, the probability of overall injury to actual occupants of a vehicle 10 having the specific architecture is predicted based on the collected injury data using the injury prediction model 210. At 414, the probability of overall injury is adjusted in accordance with a frailty parameter. In various embodiments, the occupant frailty parameters may be based on an age of an occupant and/or a gender of an occupant. In at least one embodiment, the occupant frailty parameters may be artificial intelligence (AI) generated. In various embodiments, the simulation-based vehicle event metadata is supplemented with actual event data associated with vehicles 10 having the specific architecture. The vehicle event database 208 includes actual vehicle event metadata associated with the specific vehicle architecture.

The vehicle event database 208 is configured to store the simulation-based vehicle event metadata associated with the specific vehicle architecture. Examples of simulation-based vehicle event metadata include, but are not limited to, the plurality of impact directions, the vehicle event pulses, occupant biometric data, the plurality of occupant locations within the vehicle architecture, restraint data, the probability of injury to body regions of actual occupants in the vehicle 10, and a probability of overall injury to actual occupants in the vehicle 10.

Figure 8:
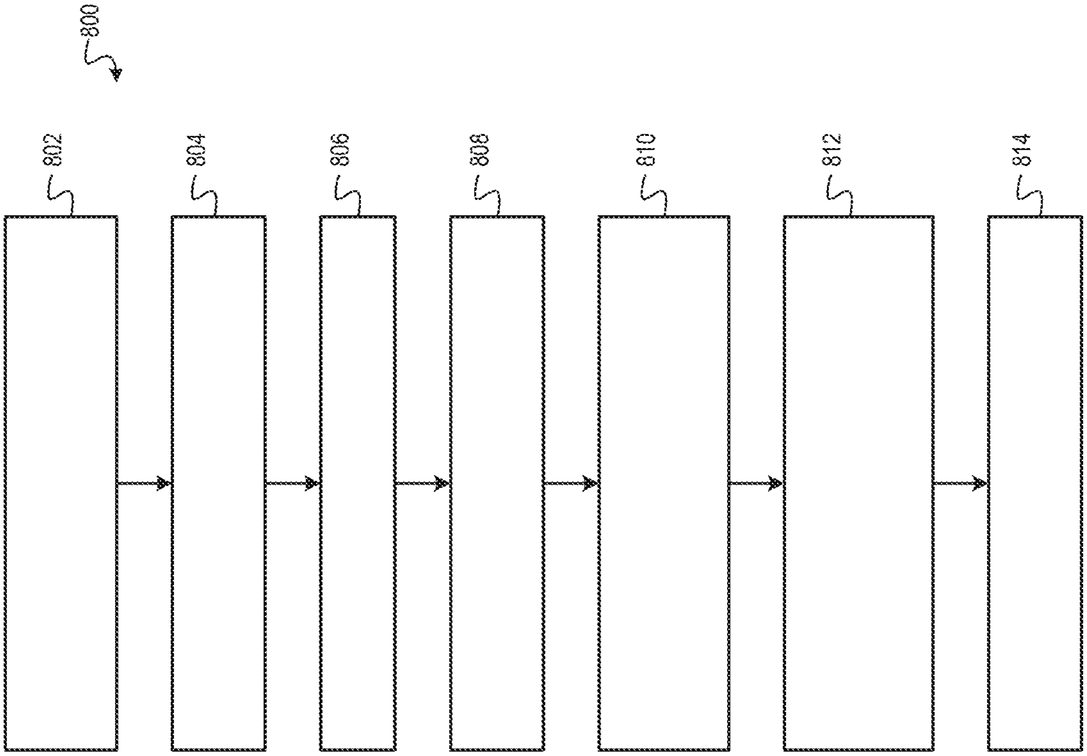
FIG. 8 is a flowchart representation of an exemplary method for predicting post-event vehicle occupant injury in accordance with at least one embodiment.

Referring to FIG. 8, a flowchart representation of an exemplary method 800 for predicting post-event vehicle occupant injury in accordance with at least one embodiment is shown. The method 800 is implemented by an embodiment of the post-event vehicle occupant injury prediction system 100. As can be appreciated in light of the disclosure, the order of operation within the method 800 is not limited to the sequential execution as illustrated in FIG. 8 but may be performed in one or more varying orders as applicable and in accordance with the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A post-event vehicle occupant injury prediction system comprising:
   - a vehicle event database comprising simulation-based vehicle event metadata associated with a vehicle architecture, the simulation-based vehicle event metadata generation being based at least in part on:
     - determining vehicle event pulses for the vehicle architecture;
     - applying the vehicle event pulses to a vehicle simulation model of the vehicle architecture;
     - collecting injury data associated with body regions of a simulated occupant within the vehicle simulation model resulting from application of the vehicle event pulses to the vehicle simulation model; and
     - predicting a probability of injury to each of the body regions of an actual occupant of a vehicle having the vehicle architecture based on the injury data;
   - at least one processor communicatively coupled to the vehicle event database; and
   - at least one memory communicatively coupled to the at least one processor, the at least one memory comprising instructions that upon execution by the at least one processor, causes the at least one processor to:
     - receive a vehicle event notification from the vehicle having the vehicle architecture;
     - receive vehicle data associated with the vehicle and occupant data associated with the actual occupant of the vehicle;
     - retrieve the simulation-based vehicle event metadata associated with the vehicle architecture from the vehicle event database; and
     - predict an injury to a first body region of the body regions of the actual occupant based on the vehicle data, the occupant data, and the simulation-based vehicle event metadata using an injury prediction model.

2. The system of claim 1, wherein the at least one memory comprises further instructions that upon execution by the at least one processor, causes the at least one processor to transmit the predicted injury to the first body region of the actual occupant to at least one of a first responder device and a hospital device.

3. The system of claim 1, wherein the vehicle event pulses comprise one of acceleration vehicle event pulses and velocity vehicle event pulses.

4. The system of claim 1, wherein the vehicle event pulses are applied to the vehicle simulation model under a plurality of vehicle event conditions comprising a plurality of impact speeds, a plurality of impact directions, a plurality of vehicle seating orientations, a plurality of occupant seating locations, a plurality of occupant vulnerabilities, a plurality of occupant postures, and occupant biometric data.

5. The system of claim 4, wherein one of the plurality of occupant postures is a reclining posture.

6. The system of claim 1, wherein the body regions comprise a head region, a neck region, a thorax region, a femur region, a lower leg region, and an abdomen region.

7. The system of claim 1, wherein the simulation-based vehicle event metadata generation is based at least in part on predicting a probability of overall injury to the simulated occupant based on the injury data.

8. The system of claim 7, wherein the predicted probability of overall injury to the simulated occupant is adjusted in accordance with an occupant frailty parameter.

9. The system of claim 1, wherein the predicted probability of injury to each of the body regions of the simulated occupant is adjusted in accordance with an occupant frailty parameter.

10. The system of claim 1, wherein the vehicle event database includes actual vehicle event metadata associated with the vehicle architecture.

11. The system of claim 1, wherein the injury prediction model comprises one of a statistical analysis model and a machine learning model.

12. The system of claim 1, wherein the simulation-based vehicle event metadata comprises a plurality of impact directions, the vehicle event pulses, occupant biometric data, a plurality of occupant seating locations, restraint data, the probability of injury to each of the body regions, and a probability of overall injury.

13. The system of claim 1, wherein the vehicle data comprises a vehicle body type, a vehicle model year, a total delta velocity, a principle direction of force, delta velocities along a first and second axis, a resultant impact delta velocity and delta direction, rollover data, and vehicle seating orientation.

14. The system of claim 1, wherein the occupant data comprises an actual occupant seating location, an actual occupant posture relative to a seat and a restraint system, actual occupant belting data, an actual occupant weight, an actual occupant height, an actual occupant frailty parameter, an actual occupant sex, an actual occupant motion, and an actual occupant position.

15. A method for predicting post-event vehicle occupant injury comprising:

providing a vehicle event database comprising simulation-based vehicle event metadata associated with a vehicle architecture, the simulation-based vehicle event metadata generation being based at least in part on:

determining vehicle event pulses for the vehicle architecture;

applying the vehicle event pulses to a vehicle simulation model of the vehicle architecture;

collecting injury data associated with body regions of a simulated occupant within the vehicle simulation model resulting from the application of the vehicle event pulses to the vehicle simulation model; and predicting a probability of injury to each of the body regions of an actual occupant of a vehicle having the vehicle architecture based on the injury data;

receiving a vehicle event notification from the vehicle having the vehicle architecture;

receiving vehicle data associated with the vehicle and occupant data associated with the actual occupant of the vehicle;

retrieving the simulation-based vehicle event metadata associated with the vehicle architecture from the vehicle event database; and predicting an injury to a first body region of the body regions of the actual occupant based on the vehicle data, the occupant data, and the simulation-based vehicle event metadata using an injury prediction model.

16. The method of claim 15, further comprising transmitting the predicted injury to the first body region of the actual occupant to at least one of a first responder device and a hospital device.

17. The method of claim 15, wherein the vehicle event pulses are applied to the vehicle simulation model under a plurality of vehicle event conditions comprising a plurality of impact speeds, a plurality of impact directions, a plurality of vehicle seating orientations, a plurality of occupant seating locations, a plurality of occupant vulnerabilities, a plurality of occupant postures, and occupant biometric data.

18. The method of claim 15, wherein the body regions comprise a head region, a neck region, a thorax region, a femur region, a lower leg region, and an abdomen region.

19. The method of claim 15, wherein the predicted probability of injury to each of the body regions of the simulated occupant is adjusted in accordance with an occupant frailty parameter.

20. A non-transitory machine-readable storage medium that stores instructions executable by at least one processor, the instructions configurable to cause the at least one processor to perform operations comprising:

providing a vehicle event database comprising simulation-based vehicle event metadata associated with a vehicle architecture, the simulation-based vehicle event metadata generation being based at least in part on:

determining vehicle event pulses for the vehicle architecture;

applying the vehicle event pulses to a vehicle simulation model of the vehicle architecture;

collecting injury data associated with body regions of a simulated occupant within the vehicle simulation model resulting from the application of the vehicle event pulses to the vehicle simulation model; and predicting a probability of injury to each of the body regions of an actual occupant of a vehicle having the vehicle architecture based on the injury data;

receiving a vehicle event notification from the vehicle having the vehicle architecture;

receiving vehicle data associated with the vehicle and occupant data associated with the actual occupant of the vehicle;

retrieving the simulation-based vehicle event metadata associated with the vehicle architecture from the vehicle event database; and predicting an injury to a first body region of the body regions of the actual occupant based on the vehicle data, the occupant data, and the simulation-based vehicle event metadata using an injury prediction model.

* * * * *